United States Patent
Martis et al.

(10) Patent No.: US 6,796,568 B2
(45) Date of Patent: Sep. 28, 2004

(54) SUSPENSION SYSTEM FOR A WHEELCHAIR

(75) Inventors: Charles J. Martis, Wyoming, PA (US); Mark E. Smith, Exeter, PA (US); James P. Mulhern, Hunlock Creek, PA (US)

(73) Assignee: Pride Mobility Products Corporation, West Pittston, PA (US)

( * ) Notice: Subject to any disclaimer, the term of this patent is extended or adjusted under 35 U.S.C. 154(b) by 126 days.

(21) Appl. No.: 10/223,645

(22) Filed: Aug. 19, 2002

(65) Prior Publication Data

US 2003/0205878 A1 Nov. 6, 2003

Related U.S. Application Data

(60) Provisional application No. 60/377,320, filed on May 1, 2002.

(51) Int. Cl.[7] .................................................. B60G 3/08
(52) U.S. Cl. .............................. 280/124.111; 280/304.1; 280/755; 180/932; 180/907; 267/152
(58) Field of Search ........................ 280/124.111, 250.1, 280/755, 304.1, DIG. 10; 180/907, 209, 9.32, 24.02; 267/152, 153

(56) References Cited

U.S. PATENT DOCUMENTS

| RE28,259 E | 12/1974 | Henschen |
| 4,043,571 A | * 8/1977 | Guerbet ............... 280/124.153 |
| 4,455,031 A | * 6/1984 | Hosaka ................... 280/250.1 |
| 5,145,020 A | 9/1992 | Quintile et al. |
| 5,575,348 A | * 11/1996 | Goertzen et al. .......... 180/65.6 |
| 5,772,237 A | 6/1998 | Finch et al. |
| 5,899,475 A | 5/1999 | Verhaeg et al. .......... 280/250.1 |
| 5,944,131 A | 8/1999 | Schaffner et al. |
| 5,964,473 A | 10/1999 | Degonda et al. |
| 5,996,716 A | 12/1999 | Montiglio et al. |
| 6,070,898 A | 6/2000 | Dickie et al. |
| 6,129,165 A | 10/2000 | Schaffner et al. |
| 6,196,343 B1 | 3/2001 | Strautnieks |
| 6,199,647 B1 | 3/2001 | Schaffner et al. |
| 6,234,507 B1 | 5/2001 | Dickie et al. |
| 6,341,657 B1 | 1/2002 | Hopely, Jr. et al. |
| 6,357,793 B1 | 3/2002 | Dickie et al. ............... 280/755 |
| 6,460,641 B1 | 10/2002 | Kral |
| 6,543,798 B2 * | 4/2003 | Schaffner et al. ........ 280/250.1 |

FOREIGN PATENT DOCUMENTS

WO    WO 34190    5/2002

OTHER PUBLICATIONS

Rosta Brochure–(undated but acknowledged as prior art.).
Quantum Blast Brochure –(undated, but available sometime in Mar. 2001.).

* cited by examiner

Primary Examiner—Paul N. Dickson
Assistant Examiner—Toan C To
(74) Attorney, Agent, or Firm—Drinker Biddle & Reath LLP

(57) ABSTRACT

A suspension system for mounting a pair of wheels to a wheelchair is disclosed. The system includes a crossbar pivotally mounted to the wheelchair so as to pivot about a longitudinal axis. At least one spring assembly is located between the crossbar and the wheelchair frame for controlling the pivoting of the crossbar. A hinge assembly is mounted on each lateral end of the crossbar. The hinge assembly includes a first hinge component attached to the crossbar so as to be rotatable about a vertical axis, and a second hinge component resiliently connected to the first hinge component. The resilient connection biases the second hinge connection against rotation with respect to the first hinge component. A wheel and yoke assembly are mounted to the second hinge component.

20 Claims, 9 Drawing Sheets

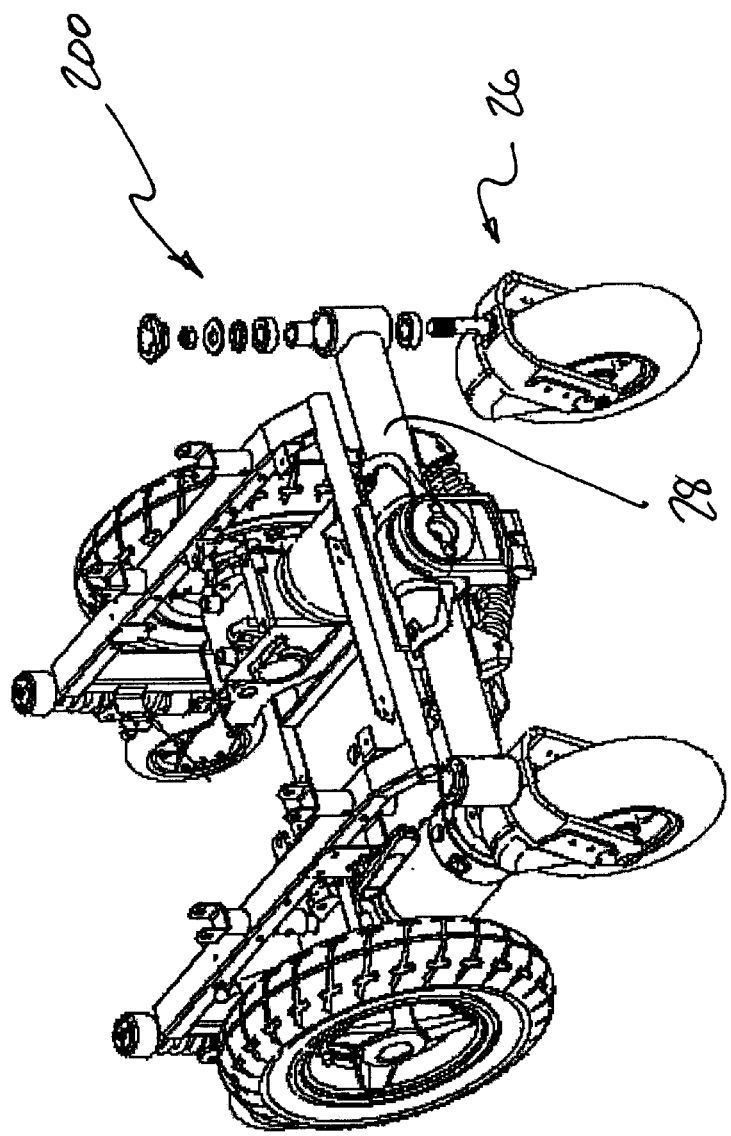

SUSPENSION SYSTEM FOR A WHEELCHAIR

RELATED APPLICATION

This application is related to and claims priority from U.S. Provisional Application Ser. No. 60/377,320, filed May 1, 2002, which is incorporated herein by reference in its entirety.

FIELD OF THE INVENTION

The present invention is generally related to wheeled vehicles. More particularly, the present invention is directed to a wheel suspension systems for wheelchairs.

BACKGROUND OF THE INVENTION

Motorized mid and rear-wheel drive wheelchairs typically include a front wheel assembly that is designed to engage the ground either continuously or sporadically, such as during climbing. In the embodiment where the front wheels are continuously on the ground, the wheel and suspension assembly are configured to carry some of the vehicle and occupant weight during operation. These types of wheels may have a caster configuration where the wheel is free to turn as needed to account for the movement of the vehicle.

In the second embodiment where the front wheels are only sporadically in contact with the ground, the front suspension holds the wheels in an elevated position with respect to the ground. The wheels are, again, typically caster type wheels.

In both types of conventional front suspension systems for wheelchairs, the suspension system is subjected to loading and displacements along or about a lateral axis (i.e., an axis extending from side-to-side of the wheelchair) and a fore-aft axis caused by one or both of the wheels contacting an object in path of travel. FIG. 1 illustrates a front wheel of a conventional wheelchair contacting an object on the ground. The object forces the wheel to move up and over the object. In many wheelchairs, the wheels are fixedly attached to the chair frame. As such, the contact with the object results in the chair being raised upward and tilted to the side. Not only is this unnerving for the user, but the impact, lifting and dropping of the chair is also uncomfortable. Also, as the vehicle transitions over rough ground, fixedly attached wheels transmit vibratory and oscillatory loads to the chair and, hence, the user. While the use of resilient tires provides some reduction in the transmission of loads (such as vibration and oscillation loads) they generally can not provide the necessary compliance to sufficiently absorb the shocks generated on rough terrain and/or upon hitting small obstacles. These unabsorbed shocks and oscillations are transmitted to the rider and result in an uncomfortable ride.

In order to minimize the displacements and loads produced by the wheel hitting an object, some conventional front wheel assemblies incorporate a resilient suspension system. These systems permit limited deflection of the front wheel with respect to the front wheel support. These suspension systems also help absorb the force of the contact that occurs when the wheel hits the object. One such system is shown in U.S. Pat. No. 6,234,507. In the embodiment shown in FIG. 8 of the '507 patent, two resilient rubber members are located within a support housing this is mounted to the frame. The resilient members surround a shaft located on each individual wheel assembly. Upon hitting an object the shaft portion is permitted to twist slightly with respect to the housing, thus accommodating some displacement of the wheel about a lateral axis.

While the suspension system in the '507 patent accommodates some of the loads and displacements described above, it does not sufficiently accommodate displacements and loading about the longitudinal (fore-aft) axis. Furthermore, the entire front suspension (wheels and frames) must be deflected before the resilient rubber elements can accommodate any of the loading or displacements.

A need, therefore, exists for an improved front wheel suspension system for a wheel chair.

SUMMARY OF THE INVENTION

The present invention relates to a suspension system for mounting a pair of wheels to a main frame of a wheelchair. In one preferred embodiment, the suspension system includes a crossbar pivotally mounted to the wheelchair so as to pivot about an axis that is parallel to the longitudinal axis of the wheelchair.

At least one spring element is located between and mounted to the crossbar and the wheelchair frame for controlling the pivoting of the crossbar. The spring biases the crossbar against rotation while also minimizing the transmission of vibratory loads. Preferably there are two spring members, one located on either side of the pivotal mounting point of the crossbar.

A hinge assembly is mounted on each lateral end of the crossbar. The hinge assembly includes a first hinge component attached to the crossbar so as to be rotatable about a vertical axis. A second hinge component is resiliently connected to the first hinge component. The resilient connection biases the second hinge connection against rotation with respect to the first hinge component and minimizes the transmission of vibratory and oscillatory loads.

A wheel and yoke assembly are mounted to the second hinge component. The hinge assembly allows the wheel and yoke to deflect upon contact with an obstacle in the wheelchairs path.

Other objects, aspects and advantages of the present invention will become apparent to those skilled in the art upon reading the following detailed description, when considered in conjunction with the appended claims and the accompanying drawings briefly described below.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 14 is an isometric view of the wheelchair illustrating the front suspension assembly with an exploded view of the anti-flutter mechanism.

DETAILED DESCRIPTION OF THE DRAWINGS

Figure 1A:
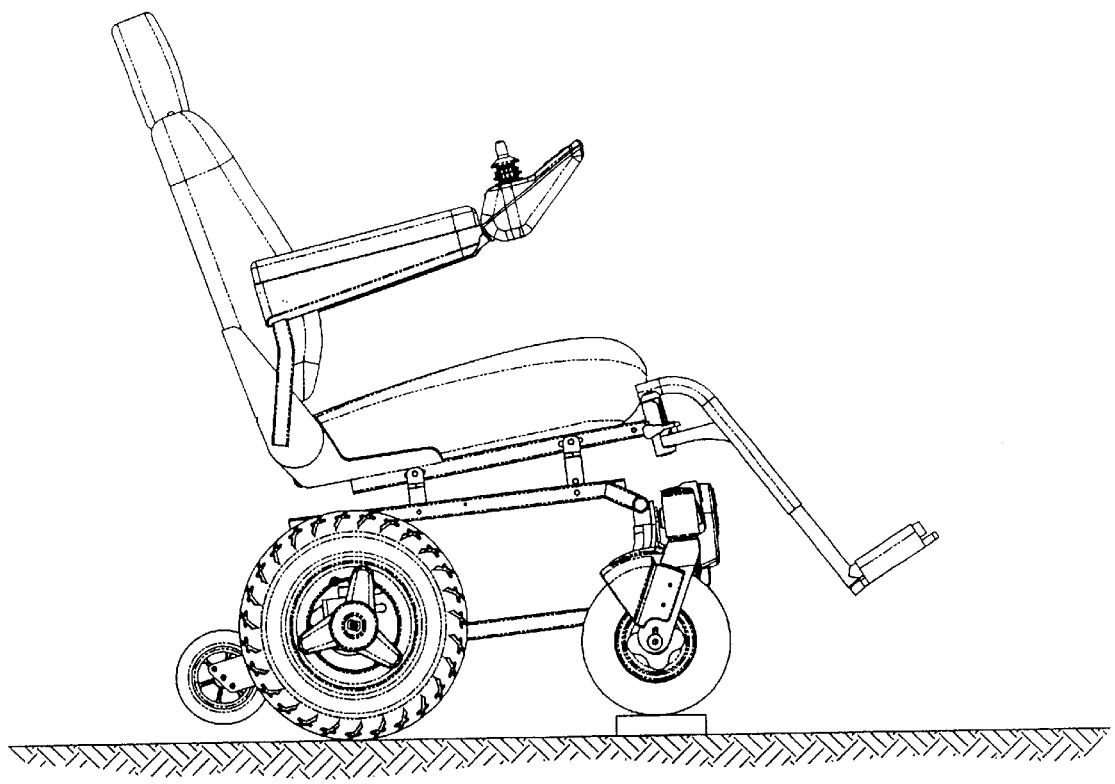
FIG. 1A is a side view of a prior art wheelchair illustrating he displacement that occurs upon contact with a stationary object.
Figure 1B:
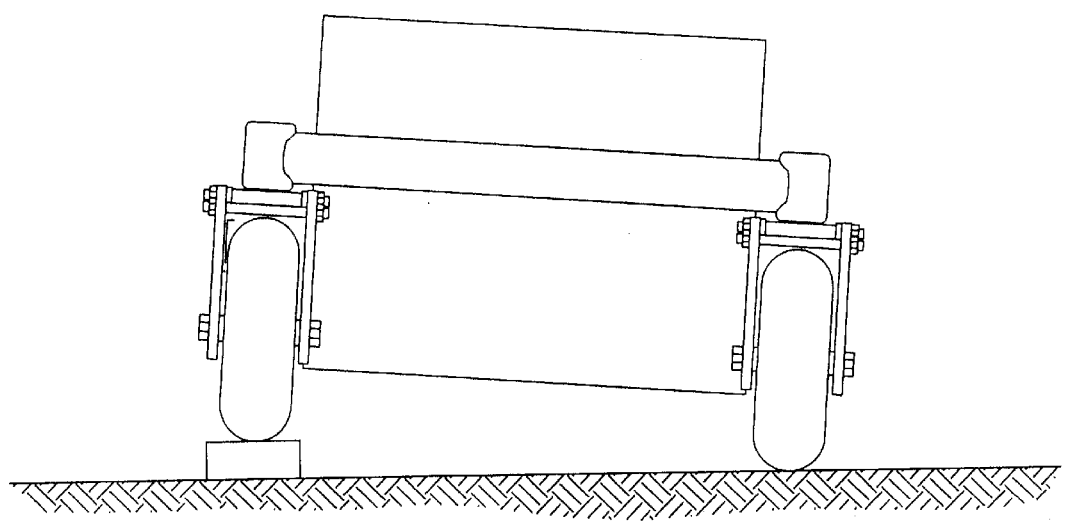
FIG. 1B is a front schematic view of a prior art wheelchair illustrating the displacement that occurs upon contact with a stationary object.
Figure 2:
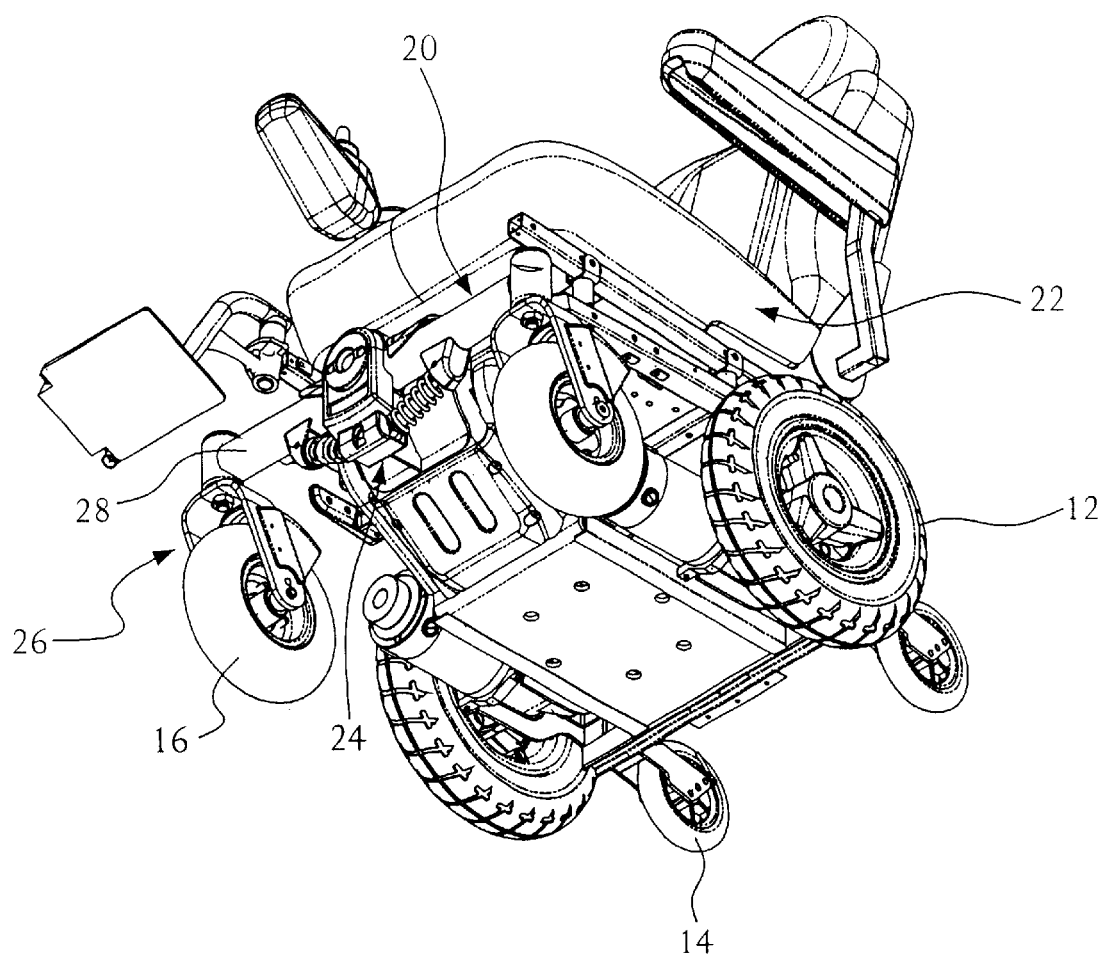
FIG. 2 is an isometric view of a wheelchair according to the present invention which incorporates a resilient front suspension system.

Referring to the drawings, wherein like numerals indicate like elements, FIG. 2 illustrates a wheelchair, which is generally denoted by the numeral 10. The wheelchair is a rear wheel drive wheelchair which includes a pair of relatively large drive wheels 12 positioned between a pair of rear wheels 14 and a pair of front caster wheels 16. The drive wheels 12 are driven by an electric motors (not shown).

The front casters 16 in conjunction with the drive wheels 12 support the weight of the wheelchair 10 and a rider 18 under normal conditions when the rider is seated. The front wheels 16 are provided to support the wheelchair weight and prevent the wheelchair 10 from tipping forward in certain situations, such as when the rider 18 is exiting the wheelchair 10; when the wheelchair 10 is in an extreme forward-tilt position (e.g., when driven down a severe slope, off of a relatively high curb or the like); and when the wheelchair is quickly accelerated in reverse or abruptly decelerated while moving forward. The front wheels 16 also help the wheelchair 10 traverse curbs and other obstacles more easily. When the wheelchair 10 is being driven under normal operating conditions, such as across a horizontal surface, the rear anti-tip wheels 14 preferably do not contact the ground.

The present invention incorporates a resilient suspension system 20 for mounting either the front or rear wheels to the main frame 22 of the wheelchair. The following discussion and the associated figures describe the invention as being used to attach the front wheels 16 to the main frame 22. However, it will be readily apparent to those skilled in the art that the present invention may be used to attach rear or mid wheels to the main frame.

The resilient suspension system 20 includes a frame attachment mechanism 24 and a wheel attachment mechanism 26. The mechanisms 24, 26 preferably operate in conjunction to provide the overall resiliency of the front suspension system 20.

More specifically, as will be discussed in greater detail below, the frame attachment mechanism 24 is configured to accommodate (react) loads that act about a longitudinal axis (i.e., loads tending to cause the wheelchair to roll.) The wheel attachment mechanism 26 is configured to accommodate (react) loads that act about a lateral axis (i.e., loads tending to cause the wheelchair to pitch.) By the incorporation of these mechanisms, the front suspension automatically adjusts for uneven terrain and/or small obstacles, thereby providing the rider with a smoother ride.

Figure 3:
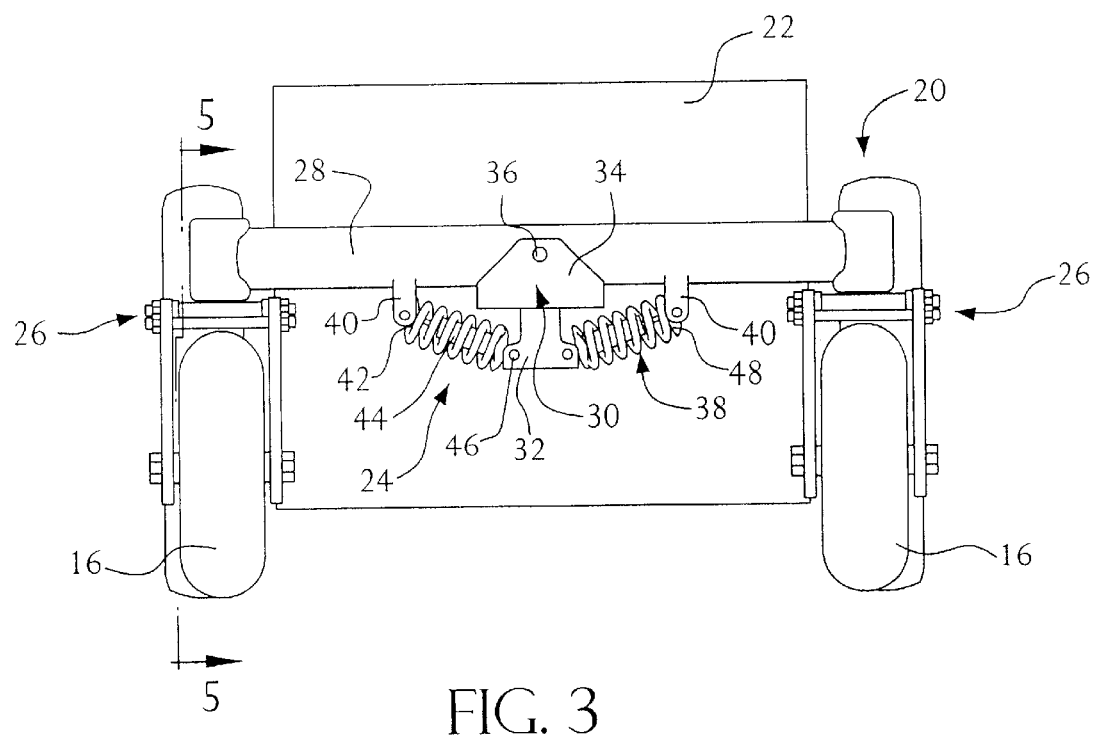
FIG. 3 is a front schematic view of a wheelchair with a front suspension system according to the present invention.

FIG. 3 illustrates a front view of the front suspension system 20 according to the present invention illustrating the frame attachment mechanism 24. As shown, the front suspension system includes a crossbar 28 which has a wheel 16 mounted at each end. The crossbar 28 is attached to the main frame 22 (schematically shown in FIG. 3) through the frame attachment mechanism. More specifically, a support bracket 30 preferably has a mounting flange 32 which is attached to the frame 22. The attachment of the flange 32 to the frame is preferably a fixed attachment. The support bracket 30 preferably includes two upstanding walls 34 between which the crossbar 28 is located. A pin 36 or similar pivotal member extends through the crossbar and engages the walls 34 so as to provide a pivotal attachment of the crossbar 28 to the bracket 30. Accordingly, the crossbar 28 can pivot with respect to the support bracket 30 (and, thus, the frame 22).

In order to maintain or return the crossbar 28 to a level orientation during normal operation, as well as provide for the limited transmission of load from the front wheels to the frame, the present invention incorporates at least one, and more preferably two, spring assemblies 38 mounted between the crossbar 28 and the support bracket 30. More specifically, the crossbar includes two flanges 40 that extend outward from the crossbar 28 on opposite sides of the support bracket 30. A first end 42 of a strut or piston 44 is pivotally mounted to the flange 40. The opposite end 46 of each strut 44 is attached to a flange on the support bracket 30. A spring 48 is located around each strut 44 (although it can alternatively be located adjacent to the strut). Strut/spring assemblies are well known in the art and, therefore, no further discussion is necessary except as noted herein. The pistons/struts are primarily used to mount the springs to the crossbar 28 and frame. In the preferred embodiment, the struts do not provide any appreciable dampening but, instead, serve to mount the spring to the wheelchair. However, it is contemplated that, in certain embodiments, it may be desirable to provide dampening through the use of struts which provide attenuation. The springs are biasing members which bias the crossbar 28 back to its non-deflected position. In the preferred embodiment, the springs are preloaded to approximately ½ of their travel. As a result, the springs are always fighting to bring the wheels into contact with the ground.

The spring/strut assembly is also preferably designed so as to permit easy calibration and adjustment of the pre-loading of the spring. In one embodiment, the strut has external threads formed about a portion of it. A retention flange is located adjacent to one side of the spring. The retention flange has threads that mate with the threads on the strut. As such, rotation of the retention flange relative to the strut produces compression or decompression of the spring. This allows the spring pre-load to be calibrated so that there is enough pre-load to maintain the wheels centered when the front wheels are off the ground, but also resilient enough to permit twisting of the cross-bar when one driving wheel is off the ground.

Figure 4:
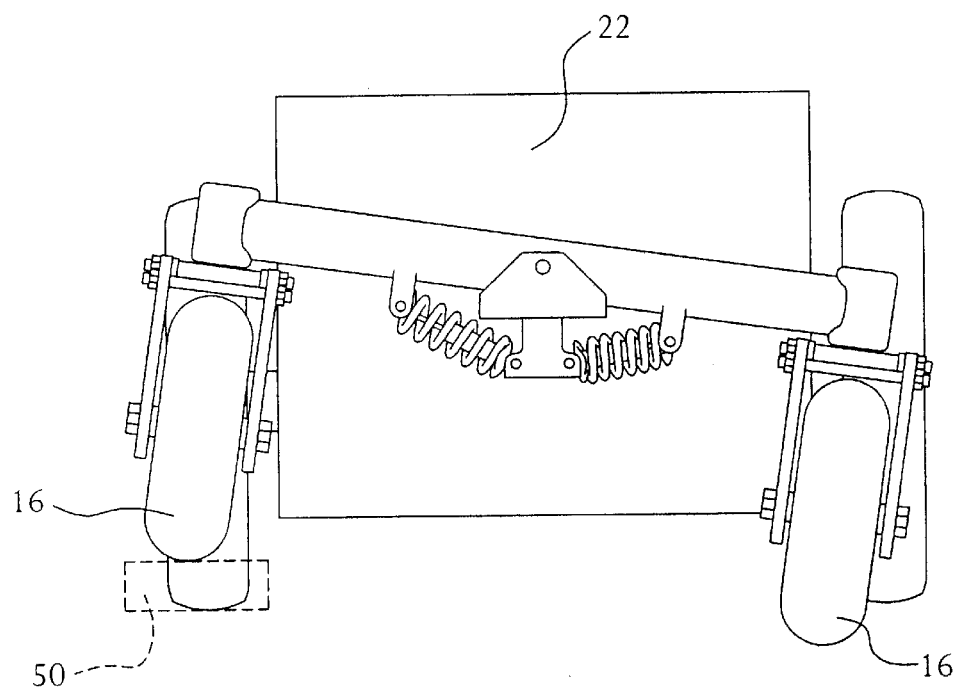
FIG. 4 is a front schematic view of the wheelchair of FIG. 3 with the front suspension system is a deflected state upon contacting an obstacle.

As discussed above, the frame attachment mechanism 24 is designed to control the displacement (pivoting) of the crossbar about a longitudinal axis of the wheelchair. As shown in FIG. 4, contrary to how conventional front wheel assemblies operate, the front suspension system of the present invention permits limited deflection of one of the front wheels 16 when it hits an obstruction 50. The frame attachment mechanism 24 permits the front wheel assembly to rotate about the pivot point 36, while allowing the main frame 22 to remain unaffected by the encounter with the obstacle. The frame attachment mechanism, however, through the strut/spring assembly, urges the wheels to maintain contact with the ground, thereby minimizing loss of control.

Also, because the two wheels are on a common cross-bar, displacement of one wheel results in the other wheel being urged toward the ground. This not only increases the traction provided by the non-displaced wheel, but the contact with the ground provides a reaction moment which tends to urge the displaced wheel to maintain contact with the obstacle. Thus, both wheels maintain traction.

Figure 5:
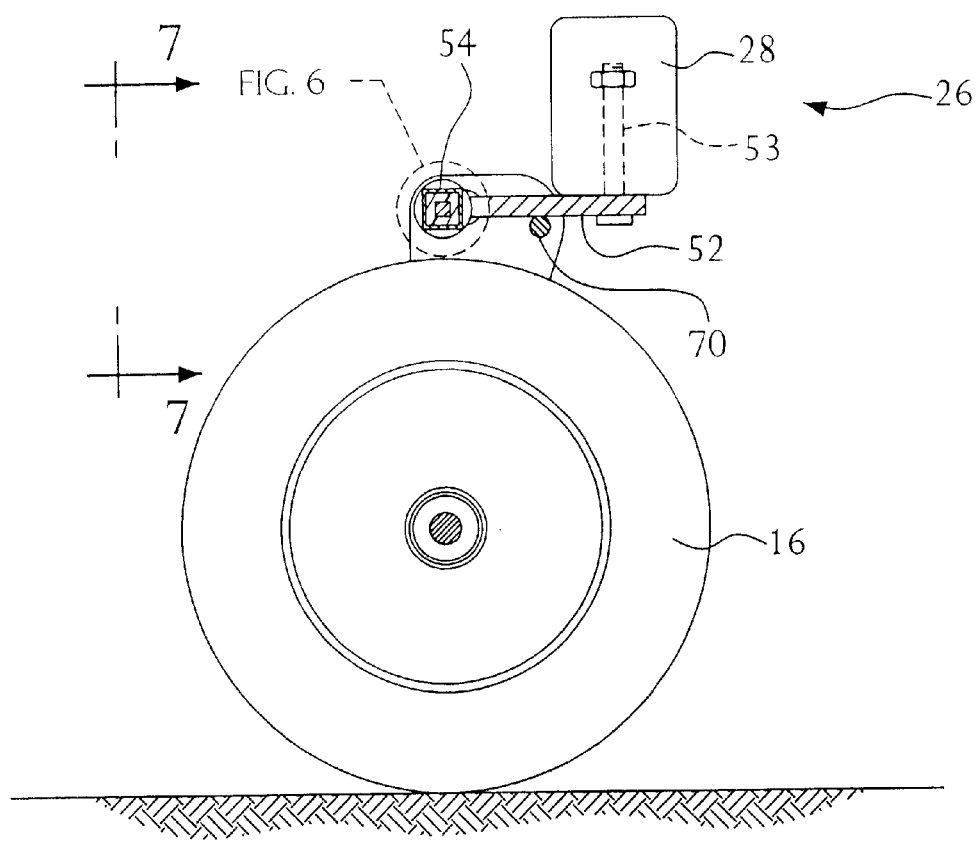
FIG. 5 is a partial sectional side view of one embodiment of the wheel attachment mechanism according to the present invention.
Figure 6:
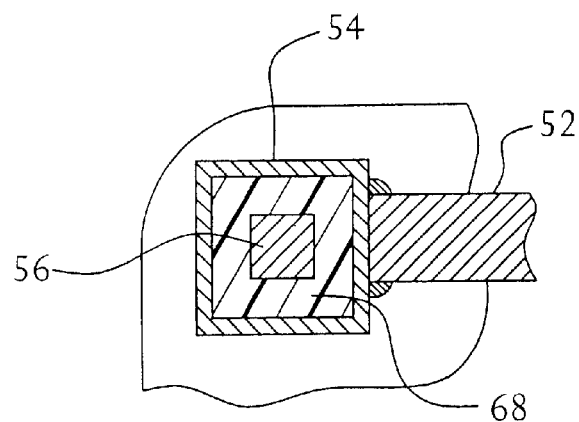
FIG. 6 is an enlarged view of a portion of the wheel attachment mechanism of FIG. 5.
Figure 7:
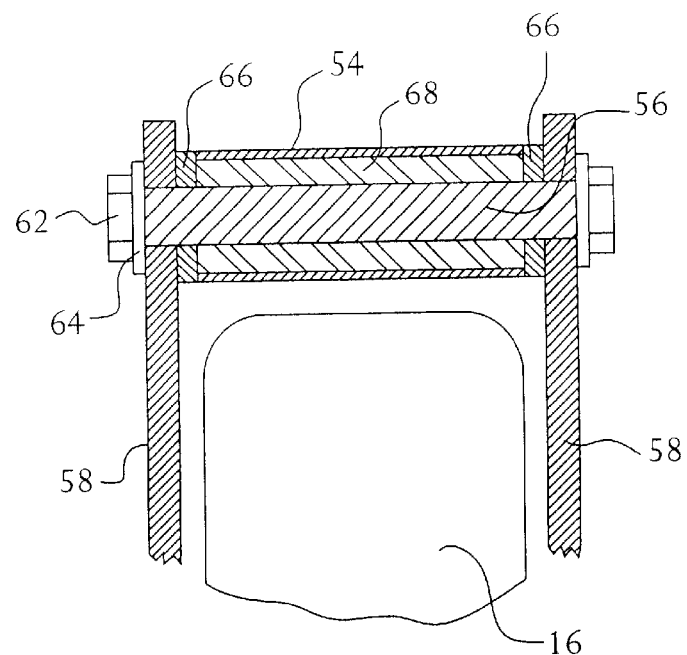
FIG. 7 is an enlarged front sectional view of the wheel attachment mechanism of FIG. 5.

Referring now to FIGS. 5–7, one embodiment of the wheel attachment mechanism 26 is shown. As will be described in more detail, the wheel attachment mechanism provides a hinged-caster-type mounting of the wheel to the crossbar. The caster-type mounting is, preferably, through a removable attachment, such as a bolted attachment as shown in FIG. 5, which permits rotation (pivoting) of the entire wheel assembly about a vertical axis. Such attachments are conventional caster-type attachments.

The wheel attachment mechanism includes a mounting plate 52 which is attached to the crossbar 28 as described above. While the bolted attachment permits rotational motion about a vertical axis, it also prevents motion of the plate 52 in other directions. The plate 52 extends aft from the crossbar 28 and includes an outer housing 54. The outer housing 54 can be molded as an integral portion of the plate 52 or, more simply, is fixed or attached to the end the plate 52 so as to be supported by the plate 52.

A shaft member 56 is located within the outer housing 54. While the shaft member 56 is shown solid in FIGS. 6 and 7, it is also contemplated that the shaft member 56 may be made as a hollow tubular member. The shaft member 56 extends out of the lateral sides of the outer housing 54 and engages with a wheel yoke that includes two wheel hinge plates 58 located on opposite sides of each wheel 16. As will become apparent hereinbelow, the shaft member 56 is rotatable within the housing 54, thus forming a pivot for the wheel yoke. In the illustrated embodiment, the shaft member 56 extends through holes formed in the wheel hinge plates 56. As will be explained in more detail below, the present invention contemplates that the shaft member 56 moves in combination with the wheel hinge plates 58. One way to accomplish this is by forming the holes in the wheel hinge plates 58 with complementary shapes to the shape of the shaft member 56. Hence, if the shaft member 56 is square (as illustrated), the holes would likewise be square, thus inhibiting relative motion between the shaft member 56 and the wheel hinge plates 58. Other types of mounting arrangements can be used to lock the shaft member 56 to the wheel hinge plates 58. A bolt 62 and washer 64 are shown to assist in preventing the shaft member 56 from sliding out of the holes.

Bearings 66 are preferably located on either side of the outer housing 54 to facilitate relative motion between the outer housing 54 and the wheel hinge plates 58. Any suitable bearings can be used in the present invention and, thus, no further details are necessary.

Figure 8:
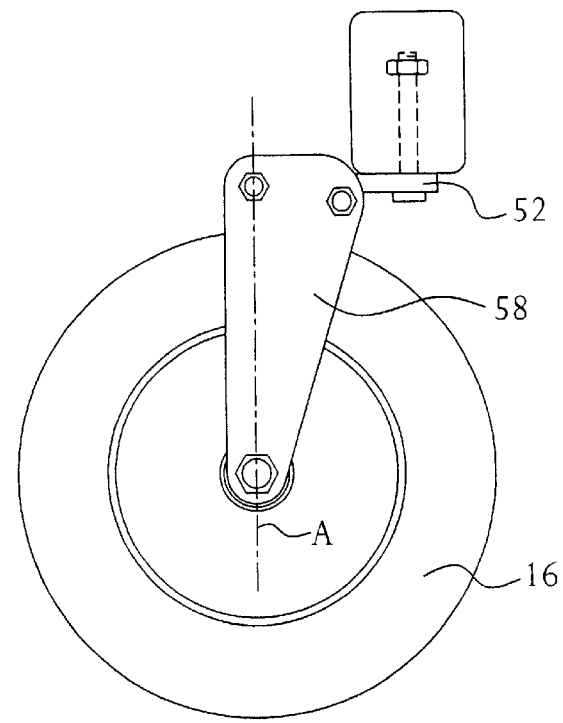
FIG. 8 is a side view of the wheel attachment mechanism of FIG. 5 in a non-deflected state.

As shown in FIG. 8, the wheel hinge plates 58 of the yoke extend down around a portion of the wheel 16. The wheel 16 is rotatably attached to the plates 58 through any conventional means such that the wheel rotates relative to the hinge plates 58.

Referring back to FIGS. 5–7, in order minimize displacements or loads (such as vibrations) from being transmitted to the frame when the front wheels 16 hits an obstruction, the present invention incorporates a resilient member 68 between the shaft member 56 and the outer housing 54. In the illustrated embodiment, the resilient member 68 is preferably an elastomer material, such as rubber, which is located between the shaft member 56 and the housing 54. The elastomer material provides two functions. First, it absorbs or dissipates small vibrations, such as those caused by the wheel hitting small objects or traversing over rough ground. Second, upon the wheel hitting a larger item, the elastomer permits the wheel to deflect with respect to the plate 52. More specifically, the elastomer permits the shaft member 56 to rotate with respect to the outer housing 54, thus allowing the wheel yoke to pivot about the outer housing 54. This second function will be described in more detail below.

Figure 9:
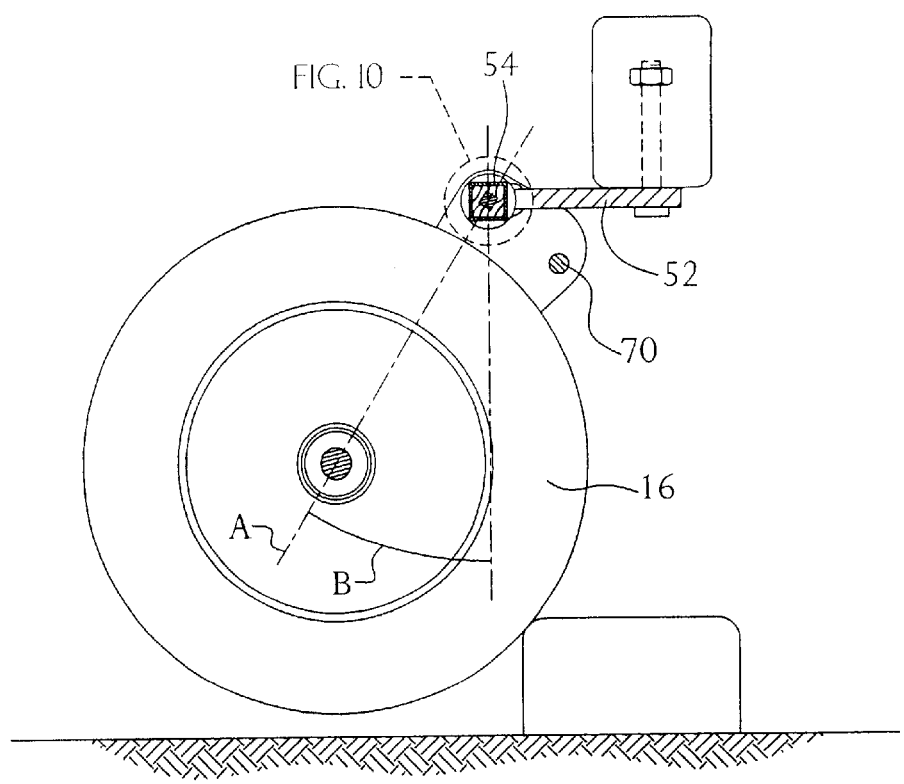
FIG. 9 is a side view of the wheel attachment mechanism of FIG. 5 in a deflected state.

As shown in FIG. 8, which is the non-deflected orientation of the wheel, the rotational axis of the wheel is substantially below pivot axis formed by the shaft member 54 and outer housing 56. (The line designated 'A' extends between the two axes.) Upon the wheel 16 hitting an obstacle, the wheel and yoke will begin to pivot about the pivot axis. This is shown in FIG. 9. The position of the rotational axis of the wheel will move aft and upwards along an arcuate path B. However, because the pivot axis starts over the rotational axis of the wheel, the arcuate path has more of a horizontal component than a vertical component. As a result, the operator of the wheelchair does not feel an sudden dipping/tilting of the wheelchair (which would otherwise be disconcerting).

Figure 10:
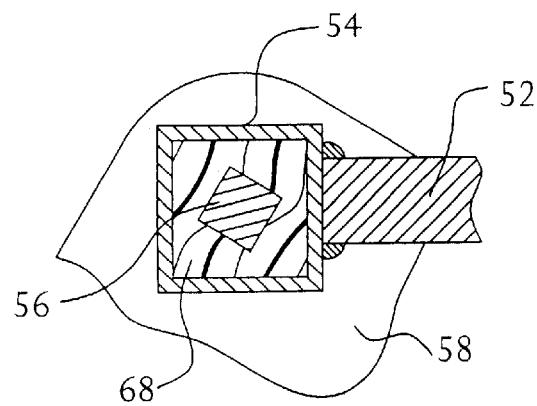
FIG. 10 is an enlarged view of a portion of the wheel attachment mechanism of FIG. 9 while the wheel is in a deflected state.

Due to the non-circular shape of the housing 54 and shaft member 56, any rotation of the shaft member 56 with respect to the housing 54 will be resisted by the elastomer material. More specifically, in the illustrated embodiment, as the square sides of the shaft member 56 rotate with respect to the housing 54, they bear into the elastomer 68 causing it to deform. This is illustrated in FIGS. 9 and 10 which shows a front wheel 16 which has been deflected upon contact with an object. The deflection causes the shaft member 56, which is attached to the wheel 16 via the hinge plates 58, to deflect with respect to the fixed outer housing 54. FIG. 10, in particular, illustrates the deformed state of the elastomer 68. However, because of the resilient/elastic characteristics of the elastomer 68, the elastomer attempts to counter-rotate the shaft 54 to return the elastomer to its non-deformed state. Furthermore, since the position of the hinge is located above the wheel 16, the elastomer 68 tends to urge the wheel downward, thereby maintaining contact with the ground. As the wheelchair continues its forward motion, the wheel 16 climbs over the obstacle and continues rolling.

A stop 70 is preferably formed on at least one of the plates and positioned to contact (or be in close proximity to) the mounting plate 52 when the wheel 16 is in a non-deflected position (FIG. 5). The stop functions to limit the counter-rotation of the hinge plates 58. In the illustrated embodiment, the stop 70 is a bolt that extends between the two hinge plates 58.

The wheel attachment mechanism shown in FIGS. 5–10 provides a novel system for providing a caster-type wheel arrangement, while permitting limited wheel deflection. As such, the system minimizes the transmission of vibrations and deflections to the main frame due to contact with an obstruction.

Figure 11:
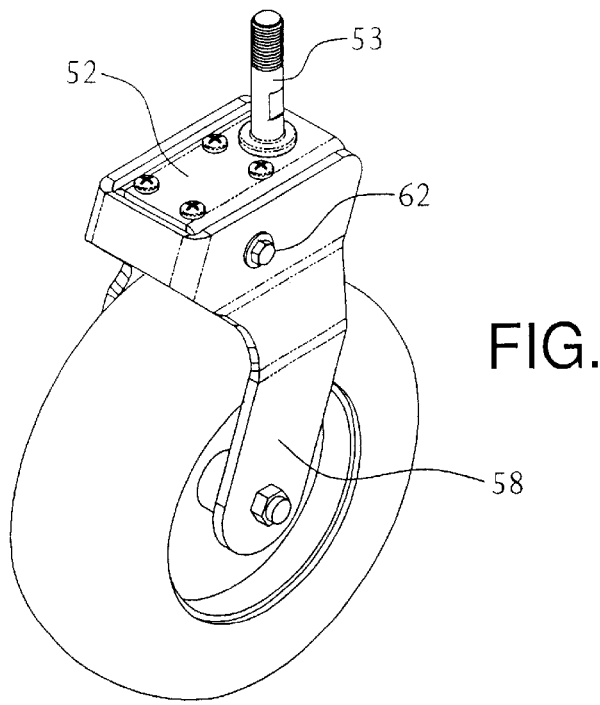
FIG. 11 is an isometric view of an alternate embodiment of the wheel attachment mechanism.
Figure 12:
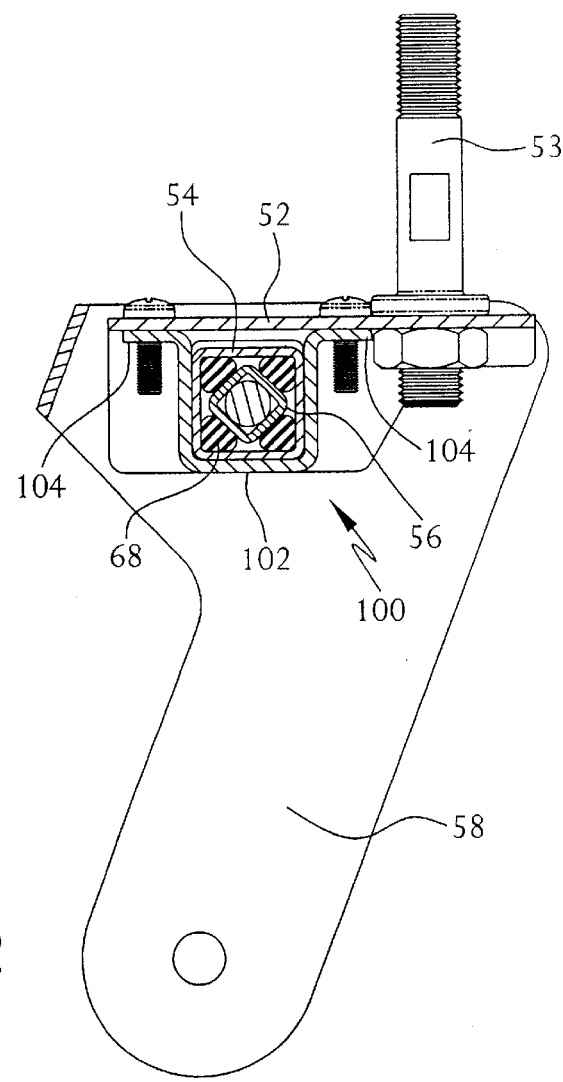
FIG. 12 is a side section view of the wheel attachment mechanism of FIG. 11.

An alternate, more preferred, embodiment of the wheel attachment mechanism 26 is shown in FIGS. 11 and 12. As in the previous embodiment, the mounting plate 52 is attached to the crossbar 28 through a bolt 53. As shown, the bolt 53 may be removably attached to the mounting plate 52 for convenience.

This embodiment also includes a hinge assembly 100 which includes an outer housing 54 and an inner shaft member 56, similar to the prior embodiment. The outer housing 54 is mounted within a hinge support frame 102 which is preferably channel-shaped with mounting flanges 104. Bolts or similar fasteners are preferably used to mounted the hinge support frame 102 to the mounting plate 52. It is also contemplated that the hinge support frame 102 could be welded to the mounting plate, if desired. The channel shape of the hinge support frame 102 receives the outer housing 54 as shown. Because the channel is complementary in shape to the outer housing 54, the outer housing 54 is essentially attached to the hinge support frame 102.

A resilient member 68 is located between the shaft member 56 and the outer housing 54. In the illustrated embodiment, the resilient member 68 is formed by a plurality of elastomer (e.g., rubber) elements that are preferably compressed between the shaft member 56 and the outer housing 54. As described above with respect to the prior embodiment, any rotation of the shaft member 56 with respect to the outer housing 54 produces deformation of the resilient member 68. One suitable shaft member 56, outer housing 54 and resilient member 68 combination is sold by Rosta AG as the Rubber Suspension System.

Although the preferred resilient member 68 is an elastomer element, it is also contemplated that the resilient member may be made from other resilient or biasing types of components, such as a torsion spring. Those of ordinary skill in the art would readily appreciate the diverse forms of resilient members that can be used in the present invention in light of the teachings provided herein.

In the embodiment illustrated in FIGS. 11 and 12, the shaft member 56 is preferably a hollow tube (see FIG. 12). A bolt 62 or similar fastener preferably extends through the shaft member 56 and attaches to he hinge plates 58 of the yoke. The bolt secures the shaft member 56 to the hinge plates 58.

The operation of the hinge assembly in this embodiment is similar to the prior embodiment. As such, no further description is necessary.

Figures 13A, 13B:
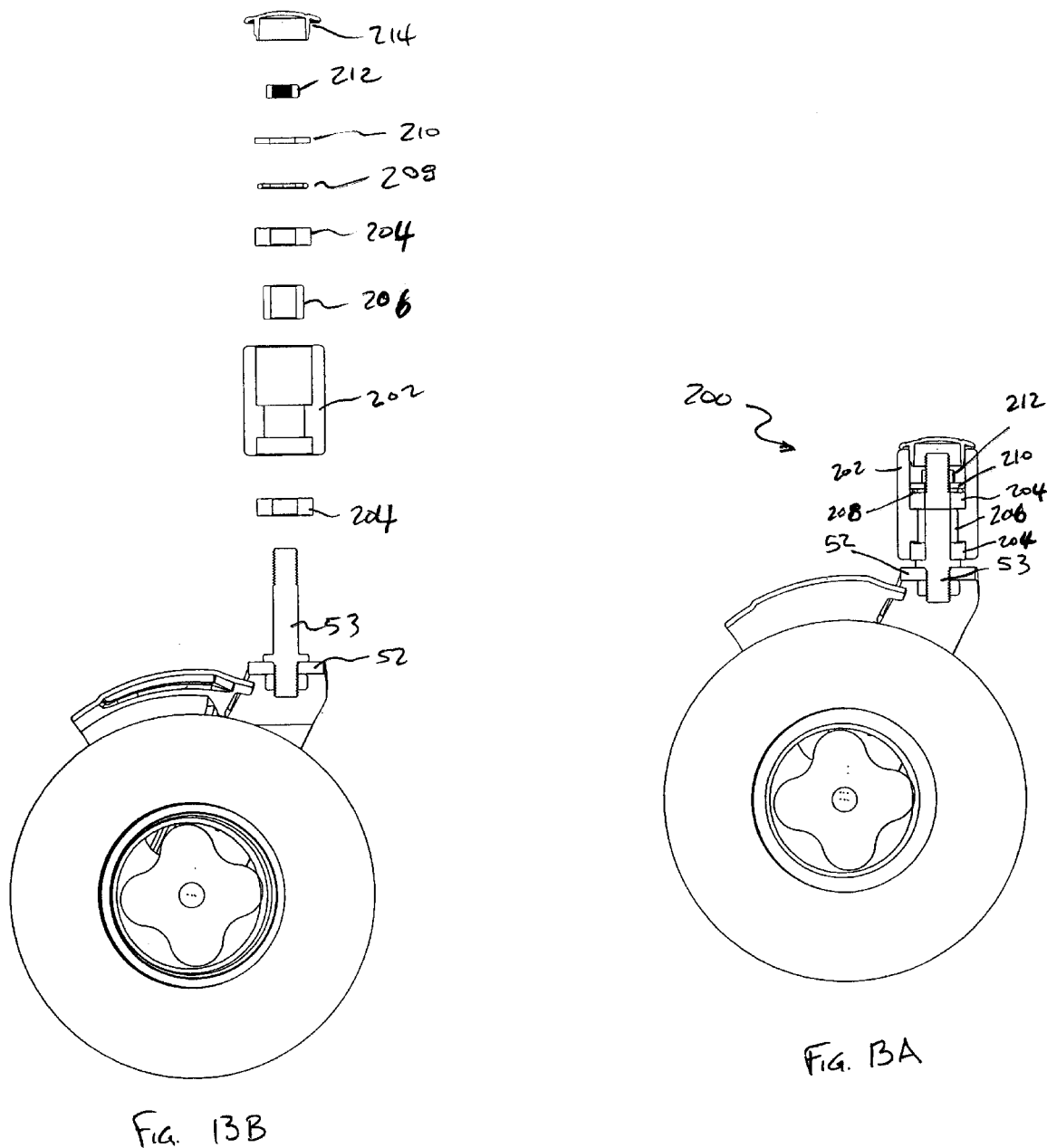
FIG. 13A is a cross-sectional view of an anti-flutter mechanism for mounting the wheel attachment mechanism to the crossbar.
FIG. 13B is an exploded cross-sectional view of the anti-flutter mechanism of FIG. 13A.

Referring now to FIGS. 13A, 13B and 14, an anti-flutter mechanism 200 is shown for attaching the wheel attachment mechanism 26 to the crossbar 28. More specifically, as described above, a bolt 53 attaches the mounting plate 52 to a bearing housing 202 on an end of the crossbar 28. The bolt 53 extends up through a portion of an interior cavity of the bearing housing 202. At least one, and more preferably two, bearings 204 are located within the housing 202. The bearings 204 includes an inner race which is disposed about an outer part of the bolt 53 and permits relative movement between the two. If two bearings are used as illustrated, then a bearing spacer 206 may be incorporated to separate the bearings 204. An O-ring 208 is disposed about the bolt 53 and located between the upper nut 206 and a top washer 210. An upper nut 212 is threaded onto a set of upper threads on the bolt. Tightening of the upper nut causes the O-ring to press against the inside diameter of the bearing housing 202, thereby producing relative friction between the bolt 53 and the bearing housing 202. A end cap 214 is removably attached to the upper end of the housing 202.

The anti-flutter mechanism 200 discussed above is designed to prevent the front wheels from spinning freely when the front wheels are off the ground. By adding a frictional interface between the wheel attachment mechanism and the crossbar, the wheel will tend to remain in the direction that it was last pointing before leaving the ground which would most likely be the intended direction of movement of the wheelchair. The present invention permits the friction provided by the anti-flutter device to be adjusted as desired.

The above mounting arrangement provides a novel suspension system for reacting loads and deflections that would otherwise be imposed on a wheelchair due to contact by the front wheels 16 with an object. The system permits each wheel to independently attenuate vibrations and deflections caused by forward contact with an object (i.e., pitch deflections), while operating in conjunction to accommodate deflections about the vehicles longitudinal axis (i.e., roll deflections.)

Accordingly, although the invention has been described and illustrated with respect to the exemplary embodiments thereof, it should be understood by those skilled in the art that the foregoing and various other changes, omissions and additions may be made therein and thereto, without parting from the spirit and scope of the claims.

What is claimed is:

1. A wheel suspension system for a wheelchair, the wheelchair including a main frame and a longitudinal axis, the system comprising:

a crossbar pivotally mounted to the frame about a first axis substantially parallel to the longitudinal axis of the wheelchair, the crossbar having ends located on opposite sides of the pivotal mounting point;

at least one spring having a first end mounted to the crossbar and a second end mounted to the frame, the spring biasing the crossbar against pivoting about the first axis;

two wheel assemblies, one wheel assembly located on each end of the crossbar, each wheel assembly including a wheel yoke and a wheel rotatably mounted to the yoke, the wheel adapted to rotate about a wheel axis; and a hinge assembly for attaching each wheel yoke to the crossbar, the hinge assembly including a first hinge component attached to the crossbar and a second hinge component attached to the wheel yoke, the first and second hinge components cooperating with one another to permit the wheel yoke to pivot about a hinge axis substantially parallel to the wheel axis, and a resilient member for biasing the wheel yoke against rotation about the hinge axis.

2. A wheel suspension system according to claim 1, further comprising a strut located adjacent to the at least one spring, the strut having a first end mounted to the crossbar and a second end mounted to the frame.

3. A wheel suspension system according to claim 2, wherein there are two springs mounted on either side of the first axis, and two struts.

4. A wheel suspension system according to claim 3, wherein each spring is a coil spring located about the outer periphery of the strut.

5. A wheel suspension system according to claim 1, wherein the resilient member is an elastomer element.

6. A wheel suspension system according to claim 1, wherein the resilient member is a spring.

7. A wheel suspension system according to claim 1, wherein the first hinge component includes an outer housing mounted to the end of the crossbar; wherein the second hinge component includes a shaft engaged with the yoke, the shaft extending through the outer housing; and wherein the resilient member is located between the outer housing and the shaft.

8. A wheel suspension system according to claim 7, wherein the first hinge component further includes a hinge plate rotatably mounted to the end of the crossbar, the hinge plate extending rearward from the crossbar, and wherein the outer housing is fixedly attached to the hinge plate.

9. A wheel suspension system according to claim 8, wherein the outer housing and shaft are both substantially square in shape.

10. A suspension system for mounting a pair of wheels to a main frame of a wheelchair, the wheelchair having a longitudinal axis, the system comprising:
- a crossbar pivotally mounted to the frame about a first axis which is substantially parallel to the longitudinal axis of the wheelchair, the crossbar having ends located on opposite sides of the pivotal mounting point;
- at least one spring disposed between the crossbar and the frame for biasing the crossbar against pivoting about the first axis;
- a hinge assembly mounted on each end of the crossbar, each hinge assembly including a first hinge component attached to the crossbar so as to be rotatable about a vertical axis, and a second hinge component resiliently connected to the first hinge component, the resilient connection biasing the second hinge component against rotation with respect to the first hinge component; and
- a wheel yoke engaged with each second hinge component, the wheel yoke rotatably supporting a wheel.

11. A suspension system according to claim 10, wherein there are two springs, one spring being located on either side of the first axis, and wherein each spring is disposed about a strut member.

12. A suspension system according to claim 10, wherein the resilient connection between the first and second hinge component is an elastomer element which is disposed about the second hinge component and which deforms upon rotation of the second hinge component relative to the first hinge component.

13. A suspension system according to claim 10, wherein the resilient connection between the first and second hinge component is a spring connection.

14. A suspension system according to claim 10, wherein the first hinge component includes an outer housing; wherein the second hinge component includes a shaft substantially fixed to the wheel yoke, the shaft extending through the outer housing; and wherein the resilient connection is an elastomer member located between the outer housing and the shaft.

15. A suspension system according to claim 14, wherein the first hinge component further includes a hinge plate with a vertical pin member, the pin member being engaged with the end of the crossbar so as to permit the rotational motion of the first hinge component about a vertical axis, the hinge plate extending substantially rearward from the crossbar, and wherein the outer housing is fixedly attached to the hinge plate.

16. A suspension system according to claim 15, wherein the outer housing and shaft are both substantially square in shape.

17. A wheel assembly for a wheelchair comprising:
- a first hinge component including a hinge plate having an attachment rod extending upward from one end of the hinge plate and adapted to rotatably mount to a crossbar, and an outer housing mounted to the hinge plate at the opposite end from the attachment rod;
- a second hinge component including a shaft extending through the outer housing, and a resilient member located between the outer housing and the shaft, the resilient member biasing the second hinge connection against rotation with respect to the first hinge component, the second hinge component; and
- a wheel yoke engaged with the shaft, the wheel yoke rotatably supporting a wheel.

18. A wheel assembly according to claim 17 wherein the outer housing and shaft are both substantially square in shape.

19. A wheel assembly according to claim 17 wherein the attachment rod on the hinge plate is rotatably mounted to a crossbar on the wheelchair so that the hinge plate is rotatable about a vertical axis.

20. A wheel assembly according to claim 17, wherein the resilient member is an elastomer element which deforms upon rotation of the second hinge component relative to the first hinge component.

\* \* \* \* \*